Nov. 26, 1968  J. W. HARRISON ET AL  3,413,465
ULTRAVIOLET STERILIZATION APPARATUS FOR DRINKING
WATER HAVING AUTOMATIC SHUTOFF MEANS
Filed July 14, 1967
6 Sheets-Sheet 1
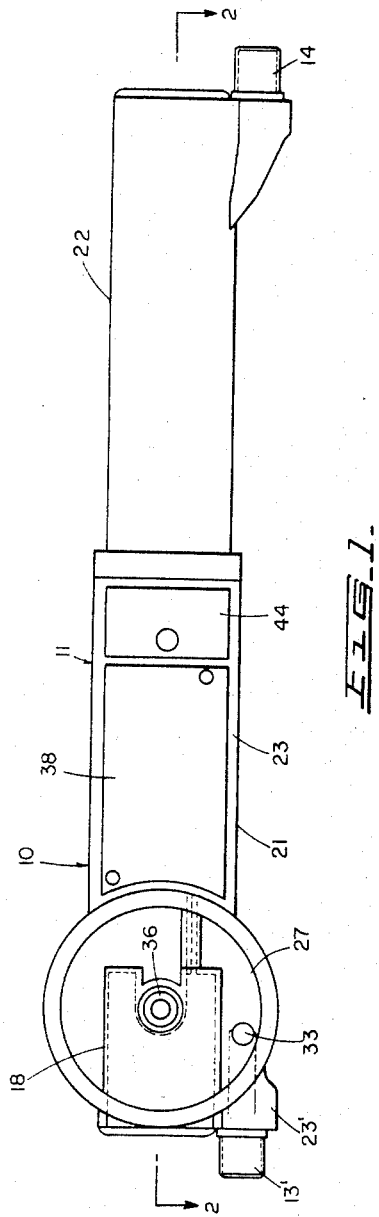
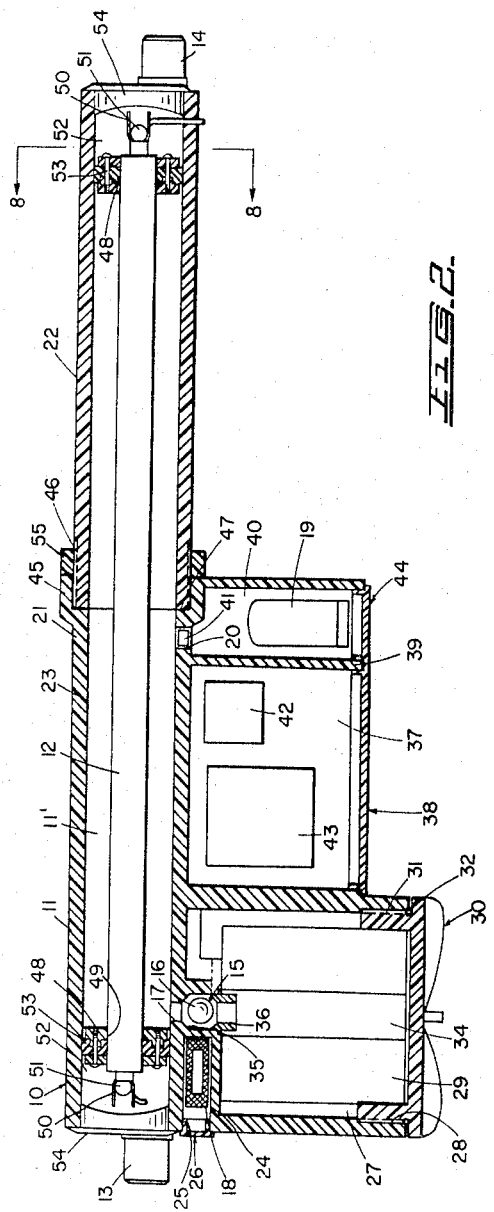
INVENTORS
JAMES W. HARRISON
RAYMOND N. FOXGORD
By Cushman, Darby & Cushman
ATTORNEYS Nov. 26, 1968   J. W. HARRISON ET AL   3,413,465
ULTRAVIOLET STERILIZATION APPARATUS FOR DRINKING
WATER HAVING AUTOMATIC SHUTOFF MEANS
Filed July 14, 1967   6 Sheets-Sheet 2

INVENTORS
JAMES W. HARRISON
RAYMOND N. BOXGORD

By Cushman, Darby & Cushman
ATTORNEYS

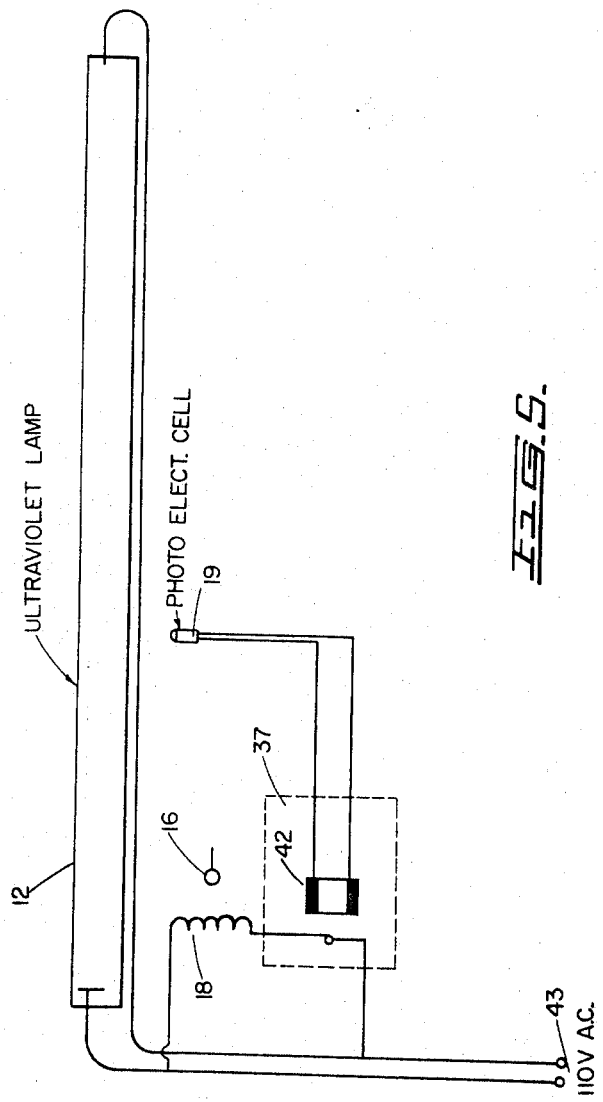

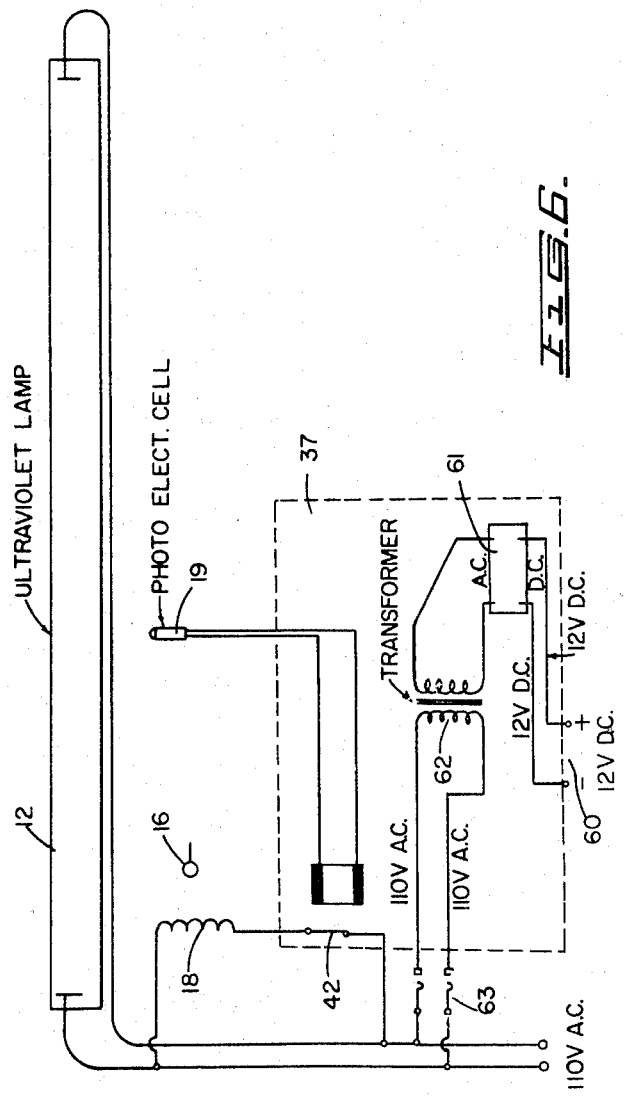

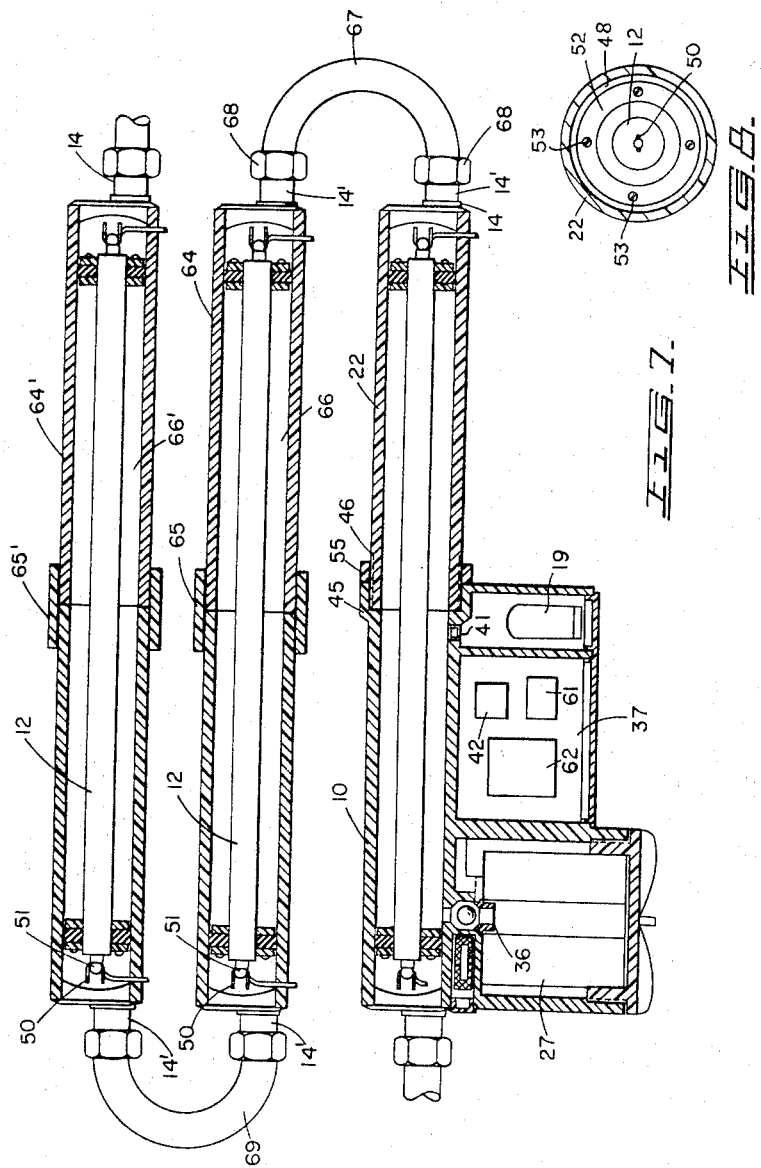

United States Patent Office 3,413,465
Patented Nov. 26, 1968

3,413,465
ULTRAVIOLET STERILIZATION APPARATUS FOR DRINKING WATER HAVING AUTOMATIC SHUTOFF MEANS
James William Harrison, Box 329, R.R. 2, 43 Halborn Ave., Ottawa, Ontario, Canada, and Raymond N. Foxgord, 17267 Parthenia, Northridge, Calif. 91324
Continuation-in-part of applications Ser. No. 310,615, Sept. 23, 1963, and Ser. No. 569,652, Aug. 2, 1966. This application July 14, 1967, Ser. No. 653,441
Claims priority, application Canada, May 10, 1963, 875,243; Great Britain, Apr. 24, 1967, 18,854/67
8 Claims. (Cl. 250—43.5)

ABSTRACT OF THE DISCLOSURE

An apparatus for sterilizing fluids, particularly drinking water, through the use of ultraviolet rays. The apparatus includes a cylindrical housing surrounding an ultralamp, the ends of which are provided with silicone rubber seals bonded to the tube, and an electrically operated valve adapted to be closed by fluid pressure in the event of electrical failure, or a decrease in ultraviolet detected by photoelectric means.

---

Figure 3:
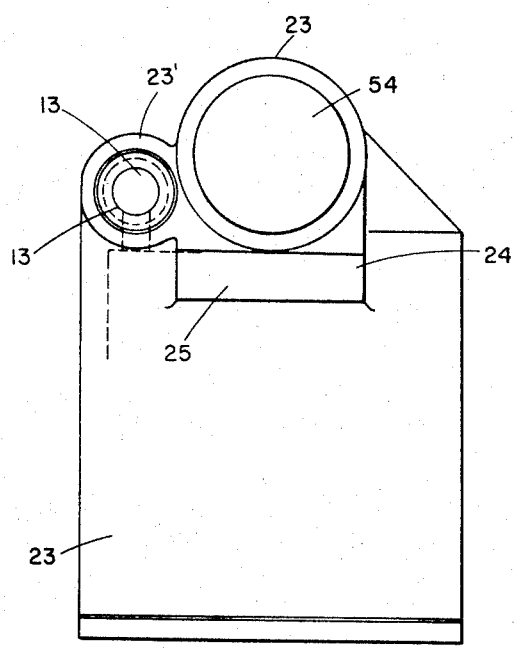

This is a continuation-in-part of application 310,615, filed Sept. 23, 1963 (now abandoned) and application 569,652, filed Aug. 2, 1966 now abandoned, entitled Ultra-Violet Sterilization Apparatus.

This invention relates to an apparatus for treating fluids and more particularly to an apparatus for the ultra-violet sterilization of a fluid.

The treating of fluids, particularly drinking water, to kill harmful bacteria has long been a problem of considerable importance.

The use of ultra-violet rays in the treatment of fluids including drinking water is well known in the art. However, problems have been encountered in providing a dependable apparatus. These problems include control of the flow of fluid so that the fluid is subjected to ultra-violet rays of the required intensity and for the required length of time effectively to sterilize the fluid.

A further problem is that of the ultra-violet lamps becoming dirty and therefore less efficient.

A still further problem is that of preventing raw water being delivered from the apparatus due to failure of the ultra-violet lamps for reasons, such as breakage, burning out of the lamps or interruption of the electrical power.

A still further problem is that of providing dependable sealing means between the ultra-violet tube and the internal wall of the sterilization chamber.

A main feature of the present invention is the provision of an apparatus for the purification of fluids in which the flow of fluid is controlled to insure the effective use of the ultra-violet rays to kill harmful bacteria in the fluid.

Another feature of the present invention is the provision of automatic shutoff means to prevent untreated water from being delivered from the apparatus, in the event of failure of the ultra-violet ray tubes for any reason.

A further feature of the present invention is the provision of filter means to reduce the buildup of dirt on the ultra-violet tubes.

A still further feature of the present invention is the provision of an apparatus for treating fluids, which apparatus is relatively inexpensive to manufacture and to install, is easily maintained and is dependable in operation.

Accordingly, there is provided, in an apparatus for treating a fluid including a housing, an ultra-violet ray source in the housing so that the fluid will flow around the ultra-violet source, an inlet conduit and an outlet conduit, the improvement comprising: valve means adapted to control the flow of fluid through the housing and photoelectric means associated with the housing responsive to rays emitted from the source to open the valve means whereby a decrease in the intensity of rays emitted by the ultraviolet ray tube will cause the photoelectric means to allow the valve to close.

Figure 4:
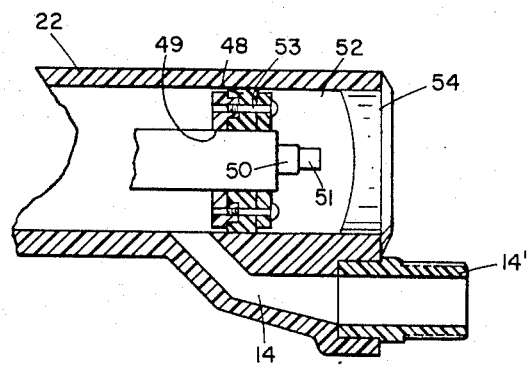

In the drawings which illustrate an embodiment of the invention:

FIG. 1 is a bottom plan view of an ultra-violet sterilization apparatus in accordance with this invention with covers and filter removed, FIG. 2 is a sectional view taken along the lines 2—2 of FIG. 1, FIG. 3 is an end elevational view of the inlet end of the ultra-violet sterilization apparatus, FIG. 4 is a fragmentary longitudinal sectional view of the outlet end of the ultra-violet sterilization apparatus, FIG. 5 is a diagram of the electrical circuits of the apparatus of FIG. 1, FIG. 6 is a diagram of the electrical circuits of the apparatus of FIG. 1 adapted for use with twelve volt direct current, FIG. 7 is a sectional side elevational view of the apparatus similar to FIG. 2 showing in addition a plurality of series connected ultra-violet tubes in modified housings, FIG. 8 is a section taken along the line 8—8 of FIG. 2, and FIGS. 9, 10 and 11 are sectional views of alternative sealing means.

Referring now in detail to the drawing, an ultra-violet sterilization apparatus is shown generally at 10 in FIGS. 1 and 2. The sterilization apparatus 10 includes in general, a housing 11 defining a sterilization chamber 11' and an ultraviolet ray tube 12 in the chamber 11'. An inlet port 13 and its associated tubular coupling 13' is provided at one end of the housing 11 and an outlet port 14 and its associated tubular coupling 14' is provided at the other end of the housing. A valve assembly 15 is provided between the inlet port 13 and the chamber 11'. The valve assembly 15 comprises a metal ball 16 adapted to be forced by the incoming fluid against the port 17 which communicates with the chamber 11'. An electromagnet 18 is provided adjacent the valve assembly 15 and, when energized, holds the metal ball 16 so that it will not close the port 17. (As shown in FIG. 2, the electromagnet 18 is not energized.) A photoelectric cell 19 is associated with the housing 11 and receives rays emitted from the ultra-violet tube 12 through a sealed window 20 in the housing 11.

All parts of the housing 11 may be made of metal although to prevent corrosion of such parts when exposed to water, it is preferred to form such parts of plastic. A suitable manner of forming such parts is by means of injection molding.

To facilitate fabrication of the apparatus, the housing 11 as illustrated comprises two portions 21 and 22 defining the substantially cylindrical sterilization chamber 11'.

As shown more clearly in FIG. 3, the left hand portion 21 of the housing, as viewed in FIGS. 1 and 2, comprises a substantially cylindrical portion 23 defining the chamber 11', a substantially cylindrical portion 23', defining the off-set inlet port 13 and depending from cylindrical portions 23 and 23', a further cylindrical filter chamber 27. A rectangular chamber 24 of non-magnetic material having an opening 25 adjacent the port 17 also of non-magnetic material is provided in the housing between cylindrical portion 23' and filter chamber 27 to receive the electromagnet 18. A cover plate 26 is adapted to close the opening 25 to the chamber 24.

The cylindrical filter chamber 27 is provided with an opening 28 to facilitate insertion of a filter element 29. A cylindrical cover plate 30 having an externally threaded flange 31 is adapted to engage internal threads at the opening 28 of the filter chamber 27. A gasket 32 is provided between the cover plate 30 and the wall of the chamber 27 adjacent the opening to provide a fluid tight seal.

The cover plate 30 presses against the end of the filter element 29 thereby forcing the other end of the filter against the closed end of the filter chamber 27.

Additional gaskets (not shown) may be required at both ends of the filter to insure a fluid tight seal at the ends of the filter element.

The inlet port 13 communicates with the filter chamber 27 through an aperture 33 (see FIG. 1). The aperture 33 is so positioned and the size of the filter element 29 is such that fluid entering the filter chamber 27 will be received between the exterior of the filter element 29 and the internal walls of the chamber 27.

The filter element 29 may comprise activated charcoal, cellulosic material, or other suitable material and is preferably cylindrical. The element 29 has a central axial bore 34 and fluid must flow through the element 29 as indicated by the arrows in FIG. 2 and into the bore 34 in order to reach the port 17 in the housing 11.

The port 17 has a restricted portion to provide a seat 35 for the ball 16. An annular ball-retaining element 36 is threadedly received in the port 17. The retaining element 36 projects downwardly into the bore 34 in the filter element 29 and assists in the proper positioning of the filter element 29.

A substantially rectangular control box 37 integrally moulded on the underside of housing 21 and is preferably provided with a cover plate 38.

One end of the control box 37 abuts and adjoins a wall of the filter chamber 27.

The other end of the control box 37 abuts and shares a common wall 39 with a compartment 40 adapted to house the photoelectric cell 19. A transparent lens 41 in the aperture 20 in the housing 11 allows the rays from the ultra-violet tube 12 to be received by the photoelectric cell 19. A cover plate 44 is adapted to close the open end of the compartment 40.

As shown in FIG. 5, the photoelectric cell 19 is electrically connected to a normally-open relay 42 in the control box 37. (See also FIG. 2.) The photoelectric cell 19 is of the photo responsive type and when energized by light rays from the ultra-violet tube provides electrical current to close the normally-open relay 42. The electromagnet 18 is electrically connected to a source of 110 volt alternating current 43 through the relay 42. A condensor (not shown) may be provided across the contacts of the relay to prevent arcing. The ultra-violet tube 12 is also electrically connected to the source of 110 v. A.C. current 43.

Turning again to FIG. 2, the housing 21, at the end remote from the inlet port 13, is provided with an integral annular flange 45 to receive and threadedly engage a threaded end portion 46 of the cylindrical portion 22 of the housing 11. A gasket 47 is provided between the end edge of housing portion 22 and the housing portion 21. Further positive engagement of housing portions 21 and 22 is provided by lock nut 55.

The inlet and outlet ports 13 and 14 respectively are preferably offset to provide access to the ultra-violet tube 12, as shown more clearly in FIGS. 3 and 4.

The ultra-violet tube 12 is provided with a conventional terminal post 50 adapted to be engaged by an end fitting 51 which is electrically connected to a suitable source of electrical current (not shown).

The tube 12 is provided with molded in place resilient sealing gaskets 48 spaced from the ends of the tube. An annular element 49 provided on the interior side of each of the gaskets 48 and a similar annular member 52 is provided at the exterior side of each gasket 48. Each element 49 has a plurality threaded blind holes to receive machine screws 53 which pass through aligned apertures in the annular member 52. Tightening the screws 53 deforms the gasket 48 to provide a more effective fluid tight seal.

It will be noted that the element 49 and the member 52 have inside diameters greater than the diameter of the tube 12 and outside diameters less than the internal diameter of the housing so that the tube 12 is resiliently mounted within the housing 12.

The gasket 10 is preferably silicone rubber which vulcanizes at room temperature as this material adheres to the glass tube. Furthermore the problem of deterioration due to the effects of ultra-violet radiation and heat encountered with other synthetics is largely eliminated.

The gasket 48 is conveniently molded by placing a two piece mold around one end of an ultra-violet tube on which annular element 49 and member 52 have been positioned. The mold (not shown) is then filled with liquid silicone rubber and allowed to cure at which time the mold is removed.

It will be noted that the end caps 54 can be removed to inspect the electrical contact 51 without draining the apparatus. Furthermore cleaning of the chamber 11' is facilitated since the gaskets 48 are removed with the tube and the chamber is thus a straight cylindrical bore. An end cap 54 is received and frictionally retained in the open end of the housing 11.

The end of housing portion 22 adjacent the outlet port 14 has means for sealing and supporting the tube 12, identical to parts described above with reference to the inlet end of the sterilization chamber 11', as shown more clearly in FIG. 4.

The power supply may vary according to the power available in the area in which the sterilization apparatus is to be used. It is intended, therefore, that the unit may be provided with electrical components which will operate on 12 volt direct current available from storage batteries in remote areas, trailers and the like. A suitable circuit as shown in FIG. 6 includes a source 60 of 12 volt direct current electrically connected to an alternator 61 which is in turn connected to a step-up transformer 62, together producing the necessary 110 volt alternating current.

The remaining portion of the circuit is identical to that described with reference to FIG. 5. The alternator 61 and the transformer 62 may be supplied as a unit to be connected to the circuit through the use of a conventional connector.

In operation, assuming the electrical components have been properly connected to each other and a suitable source of electrical current and that a supply of water or other fluid is available at the inlet port 13 of the housing 11, the fluid will enter the filter chamber 27 through opening 33 and pass through the filter element 29 as indicated by the arrows in FIG. 2.

When the ultra-violet tube 12 is energized, the light falling on the photoelectric cell 19 causes the contacts of relay 42 to close in the well-known manner. The relay 42 completes the circuits to energize the transformer 43 and the electromagnet 18. The electromagnet 18 attracts the ball away from the valve seat 35 where it has been held by the inflow of fluid, allowing the fluid to flow through the sterilization chamber 11'. The magnet 18 no longer holds the ball 16 and the latter is forced against the valve seat 35 by the fluid which thereby stops the flow of fluid to the sterilization chamber 11'.

It will be apparent that other contingencies, such as power failure, a burned out or broken ultra-violet tube or extremely opaque fluid being passed by the filter element 29, will cause the photoelectric cell 19 and its associated components to stop the flow of water, in what can be described as a "fail safe" manner.

Alternatively in FIG. 7 an ultra-violet sterilization apparatus 10, identical in every respect to the apparatus illustrated in FIGS. 1, 2, 3 and 4 is shown connected to two additional sterilization units 64 and 64'.

It will be apparent that the unit 64 comprises two tubular portions 22 of the housing 11, described and illustrated with reference to FIGS. 1 and 2, positioned so that their threaded portions 46 are adjacent so as to cooperate with an internally threaded connector 65. A sealing gasket (not shown) may be provided between abutting ends of the tubular portions.

The units 64 and 64' define sterilization chambers 66 and 66' adapted to receive an ultra-violet ray tube 12 provided with conventional end fittings 50 adapted to engage terminal posts 51 identical to those described with reference to FIGS. 1 and 2. The terminal posts 51 of the units 64 and 64' and the sterilization apparatus 10 are electrically connected in series to a suitable source of electrical current (not shown).

The coupling 14' associated with the outlet port 14 of the apparatus 10 is provided with a conduit 67 secured thereto by a conventional fitting 68. An identical fitting 68 at the other end of conduit 67 is adapted to secure the conduit 67 to the coupling 14' of the unit 64. Similarly the coupling 14' at the left hand ends of the unit 64 and 64' as viewed in FIG. 7 are connected by a conduit 69 having a coupling 70 at each end thereof.

The remaining outlet port 14 may be connected to a further sterilization unit similar to unit 65 or may serve as the outlet for the treated water.

In operation the sterilization apparatus 10 is identical to the apparatus described with reference to FIGS. 1, 2, 3 and 4 with the exception that a larger orifice may be provided in the retaining element 36 thereby increasing the rate of flow through the chamber 11'. It will be apparent that an increased flow rate is possible without decreasing the effectiveness of the sterilization procedure as the water or other fluid flows through the additional sterilization chambers 66 and 66'.

As the apparatus 10 and the additional units 64 and 64' are electrically connected in series, failure of any one of the ultra-violet tubes 12 will break the circuit, thus de-energizing the electromagnet 18 and allowing the ball valve 16 to stop the flow of fluid in the system. However the strength of the magnet 18 is such that if the rate of flow exceeds a predetermined value the magnet 18 will be unable to attract the ball away from the valve seat 35, thus ensuring that the rate of flow of any fluid passing through the sterilization chamber is such that the fluid will be subjected to a minimum exposure to the rays emitted by the ultra-violet tube 12.

It will be noted that the ball 16 is moved to one side of the valve seat or port 17 whereas if the ball 16 were pulled directly against the flow of the water a stronger magnetic field would be required.

Depending upon the water pressure involved and other factors such as heat dissipation and amount of electrical energy used to hold the valve in the open position, it may be advisable to provide for intermittent operation of part or all of the electromagnet 18. This is conveniently done by providing separate coil windings on the electromagnet, both windings being used to open the valve initially and subsequently holding the ball away from the valve seat through the use of a portion of the windings of the electromagent. On pressing a start switch both windings would be energized until the switch is released.

Alternatively a flow switch could be used to energize the electromagnet only when water is drawn through the sterilizer. In cases where water is used intermittently, power would not be wasted by holding the valve open when no water is being used.

Figure 9:
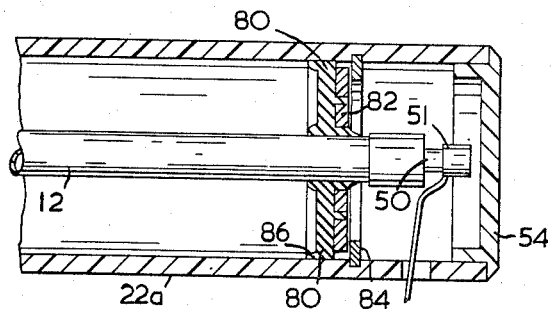

One further consideration is that of providing a coating or core of lighter material such as plastic on or in the metal ball to reduce its weight. An external coating has the added advantage of reducing corrosion and improving the seal between the valve and valve seat when the valve is closed. Alternatively as shown in FIGURE 9 the tube 12 is provided with a molded-on seal 80 of silicone rubber at each end thereof. An apertured disc 82 preferably of plastic material is bonded to each seal 80 at the outer face thereof. A removable retaining ring 84 is provided in a suitable groove in housing 22a which in other respects is similar to housing 22 described above.

It will be noted that the seals 80 have cup-shaped inner faces so that the peripheral portion 86 of the seal 80 tends to be urged against the wall of the housing 22' by the pressure of the water when in use.

Figure 10:
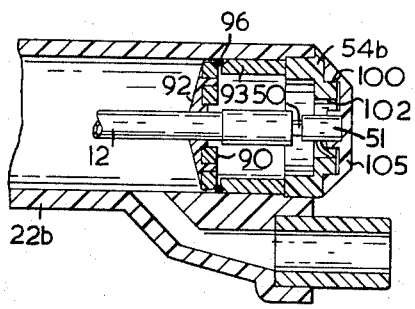

A further alternative seal construction is shown in FIGURE 10 and includes an apertured disc 90 similar to disc 82 in FIG. 9. A molded-on ruber seal 93 secures the disc 90 to tube 12. In this embodiment a housing 22b similar in other respects to housing 22 described above is adapted threadedly to receive a threaded end cap 54b. A sleeve 93 extends between the end cap 54b and the disc 90. Associated corners of sleeve 93 and disc 90 are chamfered to define therebetween a V-shaped groove to receive an O-ring 96. This form of seal facilitates installation of the tube 12 as the seal 92 does not engage the internal wall of the housing, sealing at the periphery of disc 90 being provided by the O-ring 96.

The end cap 54b has a hexagonal portion 100 to facilitate installation and removal. A central aperture 102 in the hexagonal portion 100 allows the end portion of the tube to be inspected. A cap 105 received over the hexagonal portion 100 normally closes the aperture 102. A safety interlock is readily provided to prevent dissability of the cap 54b while the tube 12 is energized and this is accomplished by securing the end fitting 51 to the cap 105. Thus the cap 105 and the fitting 51 are removed before the hexagonal portion 100 can be used to unscrew the end cap 54b. A similar seal construction is provided on the other end of the tube 12.

Figure 11:
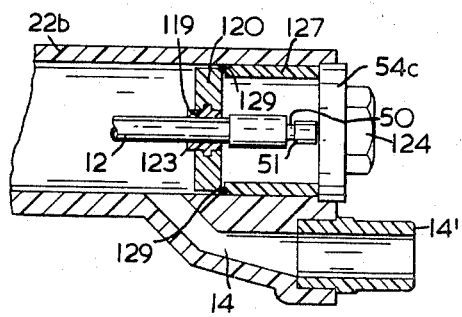

In FIG. 11 the tube 12 extends through a bore 119 in a cylindrical member 120 and is sealed to the tube 12 by an O-ring of synthetic rubber provided in a suitable groove or preferably is bonded to the tube by a molded-in-place seal 123 of silicone rubber. Sufficient clearance is provided between the outer periphery of the cylindrical member 120 and the internal wall surface of the housing 22b to facilitate inserting the tube 12 into the housing 22b. It will be understood that an identical member 120 is provided on the other end of the tube 120 and one of the members 120 must therefore move through almost the entire length of the housing 22b.

A screw cap 54c having a hexagonal portion 125 is threadedly received in the end of the housing 22b. A spacer sleeve 127 which may be formed integral with the cylindrical member 120 bears against the cap 54c. An O-ring 129 provided in a suitable groove forms a seal between the wall of the housing 22b and the cylindrical member 120.

In the event that there is a decrease in the intensity of the ultra-violet rays produced by the tube without a corresponding decrease in the visible light produced thereby the window 20 is preferably made of glass which filters visible light and permits passage therethrough of the ultra-violet light. A suitable glass for this purpose is No. 9863 Black ultra-violet transmitting glass made by the Dow Corning Company of Corning, New York, U.S.A. This is coupled with a photo-electric device which is sensitive to the ultra-violet frequency of about 2500 to 2600 angstroms.

We claim:

1. An apparatus for treating a fluid comprising a housing; an elongated cylindrical sterilization chamber in said housing; an ultraviolet ray tube in said chamber disposed coaxially with respects to said chamber so that said fluid will flow around said tube, at least one molded in place synthetic rubber gasket on said tube forming a liquid tight seal between said tube and said housing, an inlet port associated with one end of said housing; an outlet port associated with the other end of said housing whereby said housing, said inlet port and said outlet port provide a continuous passage for said fluid; said inlet port and said outlet port each being axially offset with respect to the longitudinal axis of said sterilization chamber; filter means to filter said fluid before said fluid enters said sterilization chamber; a metallic ball valve in a selected one of said ports, said ball being adapted to be seated in said selected port by the fluid thereby closing said port; an electromagnet adjacent said valve; and photo-electric means on said housing so positioned as to be responsive to rays emitted from said tube and which pass through said fluid, said photo-electric means being adapted to energize said electromagnet to open said valve, whereby a decrease in intensity of rays emitted by said ultra-violet ray tube will cause said photo-electric means to de-energize said electromagnet to allow said valve to close said port.

2. An apparatus for treating a fluid as claimed in claim 1 including at least one further housing, an elongated cylindrical sterilization chamber in said further housing, an ultra-violet ray tube in said chamber of said further housing electrically connnected in series with said first mentioned apparatus, an inlet port and an outlet port on said further housing, and a conduit connecting said inlet port of said further housing to said outlet port of said first mentioned apparatus.

3. A valve as claimed in claim 2 wherein said electromagnet has first and second sets of windings and means is provided to energize both said windings to attract said valve member away from said seat and thereafter one said winding may be used to hold said valve member away from said seat.

4. In an apparatus for treating a fluid, said apparatus being of the type including a housing, an elognated sterilization chamber in said housing, an ultra-violet ray tube in said chamber disposed coaxially with respect to said chamber so that said fluid will flow around said tube, a fluid-tight seat for sealing said ultra-violet tube in a surrounding housing, said seal comprising a molded-in-place gasket of silicone rubber adhering to said tube and being in liquid-tight engagement with an annular member on said tube and means at the periphery of said seal for providing liquid-tight engagement with said housing; an inlet port associated with one end of said housing, an outlet port associated with the other end of said housing whereby said housing, said inlet port and said outlet port provide a continuous passage for said fluid; an electrically operated valve in said inlet port, said valve and photo-electric means on said housing are so positioned as to be responsive to rays emitted from said tube which pass through said fluid whereby said photo-electric means energizes said electrically operated valve to open said inlet port, and a predetermined decrease in intensity of rays emitted by said ultra-violet ray tube causes said photo-electric means to de-energize said electrically operated valve to allow said valve to close said port.

5. An apparatus as claimed in claim 4 wherein said means at the periphery of said seal is a resilient ring of circular cross-section, and retaining means are provided to resist outward movement of said seal due to the pressure of fluid in said housing.

6. An apparatus as claimed in claim 5 wherein said housing extends beyond said seal and said retaining means is a sleeve positioned in end abutting relationship between said seal and an end cap threadedly received in an associated end of said housing.

7. An apparatus as claimed in claim 6 wherein an end fitting for electrically connecting said ultra-violet tube to a power supply is secured to a cover fitted over said end cap whereby power supply must be disconnected to remove said end cap.

8. An apparatus for treating a fluid, said apparatus comprising a housing, an elongated sterilization chamber in said housing, an ultra-violet ray tube in said chamber and disposed coaxially with respect to said chamber so that said fluid will flow around said tube; at least one molded in place synthetic rubber gasket on said tube forming a liquid tight seal between said tube and said housing; an inlet port at one end of said housing, an outlet port at the other end to provide a continuous passage for said fluid; a valve associated with one of said ports, said valve including a valve seat, a valve member adapted to be urged towards said seat, photo-electric means on said housing positioned so as to be responsive to ultra-violet rays emitted from said ultra-violet ray tube, filter means permitting the passage of ultra-violet light while preventing passage of visible light to said photoelectric means and a flow path between said ultra-violet ray tube and said photo-electric means for said fluid, whereby ultraviolet rays pass through said fluid and are received by said photo-electric means to energize said electromagnet to open said valve and whereby a predetermined decrease in the intensity of rays received by said photo-electric means causes said photo-electric means to de-energize said electromagnet thereby allowing said valve member to be urged against said valve seat.

References Cited
UNITED STATES PATENTS

| | | | |
|---|---|---|---|
| 2,056,322 | 10/1936 | Hoppe | 251—141 |
| 2,096,808 | 10/1937 | Jenkins et al. | 251—141 |
| 2,298,124 | 10/1942 | Hartman | 250—43.5 |
| 2,519,607 | 8/1950 | Steynor | 251—137 |
| 2,620,822 | 12/1952 | Peterson et al. | 251—137 |
| 2,667,584 | 1/1954 | Rhodes | 250—45 |
| 3,061,721 | 10/1962 | Brenner | 250—43 |
| 3,182,193 | 5/1965 | Ellner et al. | 250—43.5 |

RALPH G. NILSON, *Primary Examiner.*

A. L. BIRCH, *Assistant Examiner.*